Feb. 20, 1945.   R. RASMUSSEN   2,369,798
WATER GAUGE
Filed July 31, 1944
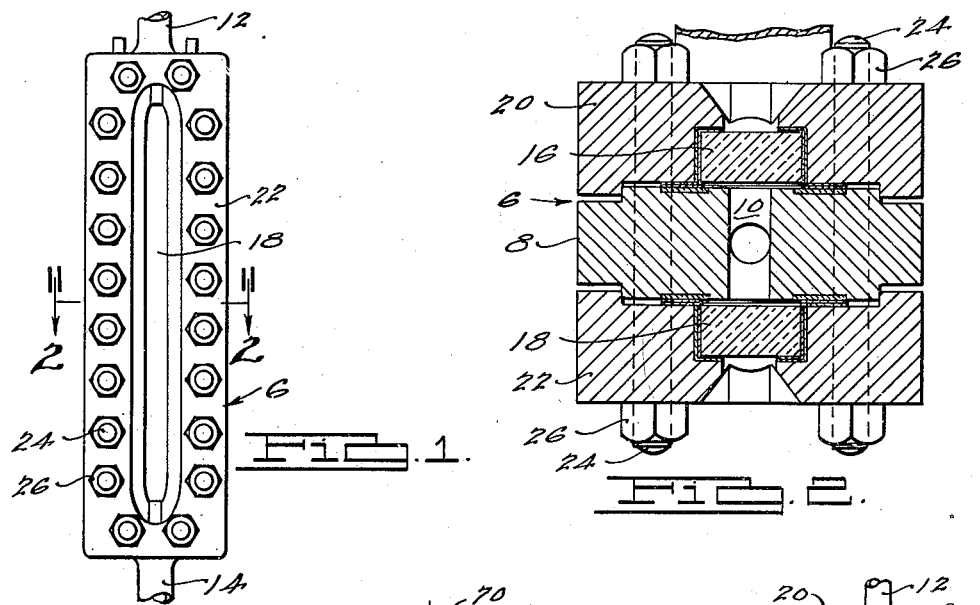
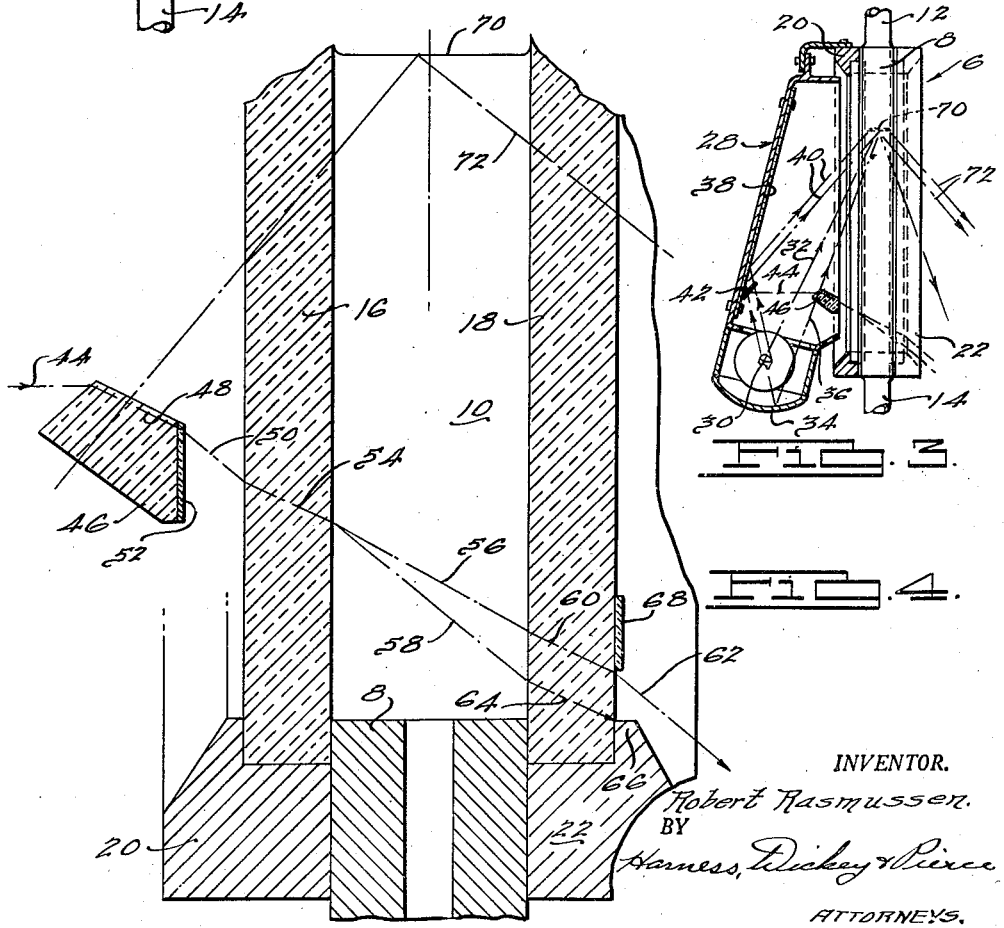
INVENTOR.
Robert Rasmussen.
BY
Harness, Dickey & Pierce
ATTORNEYS.

UNITED STATES PATENT OFFICE 2,369,798

WATER GAUGE

Robert Rasmussen, Detroit, Mich., assignor to Diamond Power Specialty Corporation, Detroit, Mich., a corporation of Michigan Application July 31, 1944, Serial No. 547,412

3 Claims. (Cl. 73—293)

This invention relates to an apparatus for determining the presence or absence of a liquid by visual inspection of a sight gauge.

The main objects of this invention are to provide an improved device for clearly and definitely indicating the presence or absence of a liquid within a desired space; to provide an illuminated water level sight gauge which will clearly indicate the presence or absence of water within the gauge when the meniscus is not visible by reason of being located either above or below the sight portion of the gauge; to provide a water level sight gauge in which the presence or absence of water, in the lower end of the gauge, will be indicated clearly by a distinctive beam of light emerging from the gauge; and to provide a device of this character which is simple and rugged in construction and of low original and maintenance cost.

An illustrative embodiment of this invention is shown in the accompanying drawing, in which Fig. 1 is a view in front elevation of a high pressure water level sight gauge having opposite, flat, glass side walls;

Fig. 2 is an enlarged, sectional view, taken on the line 2—2 of Fig. 1, looking in the direction indicated by the arrows;

Fig. 3 is a vertical, medial, sectional view of the gauge illustrated in Fig. 1 and equipped with illuminating means and showing the paths of the light beams;

Fig. 4 is an enlarged, fragmentary, vertical, sectional view showing in detail the two paths of the light beams under varying conditions.

Throughout the years in which gauge glasses have been used to permit operators to observe the water level in closed vessels such as boilers, the operator has always judged of the water level by the position of the meniscus which forms on the interior of the gauge glass, whether it is a round or a rectangular volume of water such as in flat glass gauges. When this meniscus is illuminated from below on a side opposite the operator's position, there is generally a bright, shiny star present which readily indicates the position of the water level. However, when the gauge glass is either empty or full, and the meniscus is not visible, it is very difficult for an operator to determine which condition is present.

One improvement which has gone into extensive use to aid in the determination of water level is the bi-color gauge. By the arrangement of a bi-color illuminator and a special arrangement of the glass plates enclosing the water or steam space in the gauge, it is possible to produce an optical color effect so that the water appears green, and the steam or air space above the water appears red. The water level is where the green and red join, and it is very easy to distinguish the water level by means of this arrangement. If the gauge glass is full, the vision space is all green, and an operator knows at once that the gauge is full. If the gauge is empty, the vision space appears all red and an operator knows that the gauge is empty. There is, therefore, a very distinct indication whether the water level is intermediate in the vision slot, or above or below, and it is this certainty of determination which has made this gauge glass construction valuable.

In the clear glass gauge, where the glass plates enclosing the water space are parallel to each other and where it is illuminated by a plain light from below, there is no color effect present. The light shining upward from below is reflected downward from a meniscus which is brightly illuminated compared to the rest of the vision space on the gauge, and there is no mistaking where the water level actually is, as long as the meniscus is not above or below the ends of the vision space.

The present invention is intended for use with an illuminated type of gauge, and some of the rays from the illuminator are reflected substantially horizontally through a prism, then downward at an angle through the gauge, and if water is present, this beam emerges on the opposite side of the gauge at a small space or window at the lower end of the vision space. An opaque shield is arranged just above the lower end of the vision space so that the light rays are sharply defined in this lower portion of the vision space.

Normally, therefore, if the water level is observable, the operator will see a meniscus brightly illuminated from the regular rays of the illuminator. In addition to the meniscus, he will see a brightly illuminated space at the lower end of the vision slot, and a colored screen may be placed in the path of the light rays, as for instance, against one side of the prism, so that this illuminated space at the lower end of the vision slot will be lighted by the color of the interposed color screen. This could be green or any other color desired, so that it would be very distinct in the appearance of the gauge. If, however, the gauge were empty, the light rays are deflected so that they do not pass through the gauge, and therefore this spot at the bottom of the vision slot would be dark, and the operator would know that the gauge was empty.

If the gauge were full so that the meniscus was above the vision slot, the operator would not see the meniscus but would see this brightly illuminated space at the lower end of the vision slot, and he would know that the gauge was full.

This device supplies a long-felt want as far as clear glass gauges are concerned, and clearly indicates whether the gauge is full or empty when the meniscus is not observable. The use of a color screen adjacent the prism is optional, inasmuch as frequently observers are color-blind and cannot distinguish colors, particularly red and green, in which case a clear light without the use of a color screen would be satisfactory.

The functioning of the present invention depends, of course, on natural well-known laws that the index of refraction differs when glass is in contact with water from what it is when glass is in contact with air. For instance, a light ray passing from glass into air has an index of refraction of two-thirds. However, when passing from glass into water, the index of refraction is eight-ninths. The definition of the index of refraction may be indicated by the sine of the angle of incidence divided by the sine of the angle of refraction. The angle of incidence is measured between the perpendicular to the surface at the point where the light ray strikes that surface and the light ray. The angle of refraction where the light ray passes into another substance, the substance, therefore, being transparent, is measured between a continuation of this perpendicular and the light ray after it has passed through the surface it first strikes.

A light ray passing from glass into air, or a non-liquid medium, is bent or deflected more than when it passes into a liquid, the index being two-thirds.

Again, when the light ray passes from water or liquid to glass, its index of refraction is nine-eighths; and where it passes from air to glass, the index of refraction is three-halves, so that the light rays are bent differently when leaving a liquid or other fluid into glass.

This principle could be applied either to a gauge having flat glasses with a water space between them, or to a round glass tube such as is commonly used on low pressure boilers.

In the construction shown in the drawing, a high pressure, water level sight gauge generally designated 6, of well-known construction, comprises a generally rectangular, relatively flat middle or center member 8 having a slot 10 cut lengthwise therethrough and communicating at its upper and lower ends with water connections 12 and 14.

Opposite sides of the slot 10 are closed by heavy glass plates 16 and 18 which are held in position by metal plates 20 and 22 which are of the same general shape as the center member 8 and have elongated slots in registry with the slot 10. The plates 20 and 22 are recessed on their inward faces to receive the glasses 16 and 18, respectively, and suitable gaskets are provided around the glasses and between the plates and center member for securing a sealed water space capable of withstanding high pressure. The entire assembly is held securely together by a series of tie-bolts 24 which are provided with nuts 26 bearing against the outside surfaces of the cover plates 20 and 22.

The gauge 6 is provided with means for illuminating the meniscus, and comprises a housing, generally designated 28, secured against one side of the gauge and having three closed sides with one side open toward the slot at that side of the gauge, so that light is projected through the slot and illuminates the gauge glass from top to bottom. A source of light, such as an incandescent bulb 30, is located in the lower end of the illuminator 28 and positioned to project light rays directly against the meniscus as indicated by the ray 32; indirectly by reflection from the arcuate bottom 34, as indicated by the ray 36; and from a reflector plate 38 secured to the back wall of the illuminator as indicated by the rays 40.

The rear wall of the illuminator 28 is provided with a reflector 42 in the form of a mirror positioned at an angle to project a beam substantially horizontally, as indicated by the ray 44, across the lower end of the illuminator into one side of a prism 46. Rays entering the prism 46 are deflected downwardly as indicated by the ray 48 and emerge as indicated by the ray at 50. If it is desired to use a color screen in the path of the light beam, such color screen, as indicated at 52, may be secured to the side of the prism, although such particular location is not essential to the successful operation of the device.

The beam, as indicated by the ray at 54, is deflected as it passes into the gauge glass 16, and as it emerges from the inner wall thereof, is again deflected to one or the other of two predetermined paths as indicated by the rays at 56 and 58. If a liquid, such as water, is present in the space 10, the beam will be deflected as indicated by the ray 56. When the beam takes that path, the rays will be deflected again as they pass into the gauge glass 18, as indicated by the ray at 60, and again as it emerges from the opposite side, as indicated by the ray at 62.

However, if liquid is absent from the space 10, the beam will be deflected, as indicated by the ray 58, and then pass through the glass 18, as indicated by the ray at 64, it being understood that these indicated positions of the rays are the uppermost or top rays of the light beams. When deflected so as to take the lower path as indicated at 58 and 64, the topmost ray will strike against the shoulder 66 of the front closure plate 22, and none of the rays from this beam will emerge from the outer surface of the glass 18.

A strip of opaque material 68 is positioned horizontally across the face of the side opening in spaced relation above the shoulder 66 so as to define a window through which the light rays are projected when taking the upper path as indicated by the ray at 56 and 60. The use of the strip 68, however, is not essential to the successful operation of the device but is helpful in defining a definite place through which the light rays emerge from the apparatus.

It is to be noted that the prism 46, which has its upper and lower sides polished and substantially parallel, does not interfere with the passage of light from the source 30 directly to the meniscus, which is indicated at 70, so that if the meniscus is located within the sight range of the slot, its brilliant star can be seen by the operator looking upward at an angle as indicated by the ray 72.

It will also be understood that although a prism is illustrated for bending the light rays downwardly when projected substantially horizontally across the illuminator, it is not essential to the successful operation, inasmuch as the mirror 42 could be positioned to deflect the rays across the illuminator and downwardly at the appropriate angle to secure the desired deflection as the rays emerge from the inner wall of the glass 16.

As heretofore described, the functioning of the apparatus is dependent upon the well-known natural law that the index of refraction differs when glass is in contact with water from what it is when glass is in contact with air or steam. The arrangement is such that when the space 10, within the gauge through which the light rays are projected, is occupied by water, the rays will emerge through the window defined by the shoulder 66 and the shield 68 and that the beam will be deflected below this window when the lower end of the space 10 is occupied by steam or air. It is obvious, of course, that this arrangement could be reversed so that no light emerges when the space is filled with water, but that a colored light beam, such as red, would emerge from the window and be seen by the operator when the water level fell below the path of the projected beam.

What is claimed is:

1. A boiler water level sight gauge comprising a housing having a pair of oppositely disposed, parallel, transparent walls positioned to receive the liquid therebetween, means forming an enclosure exteriorly of and over one of said transparent walls, a source of light within said enclosure, a reflector within said enclosure positioned to reflect a beam of light from said source toward the liquid to illuminate the meniscus, a prism disposed within the enclosure adjacent the exterior face of one of said walls, and adjacent one end thereof, another reflector disposed within the enclosure and positioned to direct a beam of light from the source to the prism independent of the beam to the meniscus.

2. A boiler water level sight gauge comprising a housing having a pair of oppositely disposed, parallel, transparent walls positioned to receive the liquid therebetween, means forming an enclosure exteriorly of and over one of said transparent walls, a source of light within said enclosure, a reflector within said enclosure positioned to reflect a beam of light from said source toward the liquid to illuminate the meniscus, a prism disposed within the enclosure adjacent the exterior face of one of said walls, another reflector disposed within the enclosure and positioned to direct a beam of light from the source to the prism independent of the beam to the meniscus, said last-named beam of light then passing from the prism through the adjacent transparent wall to the space between the transparent walls, the arrangement being such that said last-named beam, when deflected by liquid in the path thereof, will follow one predetermined path, and when deflected when liquid is absent in the path of the beam, will follow another predetermined path, one of said last-named paths only being located so that the beam will emerge from the opposite transparent wall of the gauge.

3. A boiler water level sight gauge comprising a housing having a pair of oppositely disposed, parallel, transparent walls positioned to receive the liquid therebetween, means forming an enclosure exteriorly of and over one of said transparent walls, a source of light within said enclosure, a reflector within said enclosure positioned to reflect a beam of light from said source toward the liquid to illuminate the meniscus, a prism disposed within the enclosure adjacent the exterior face of one of said walls, and adjacent the lower end thereof, another reflector disposed within the enclosure and positioned to direct a beam of light from the source to the prism independent of the beam to the meniscus, said last-named beam of light then passing from the prism through the adjacent transparent wall to the space between the transparent walls, the arrangement being such that said last-named beam, when deflected by liquid in the path thereof, will follow one predetermined path, and when deflected when liquid is absent in the path of the beam, will follow another predetermined path, one of said last-named paths only being located so that the beam will emerge from the opposite transparent wall of the gauge.

ROBERT RASMUSSEN.